March 29, 1927.
W. E. BUZBY
1,622,417
GLASS DRAWING AND APPARATUS THEREFOR
Filed April 7, 1925
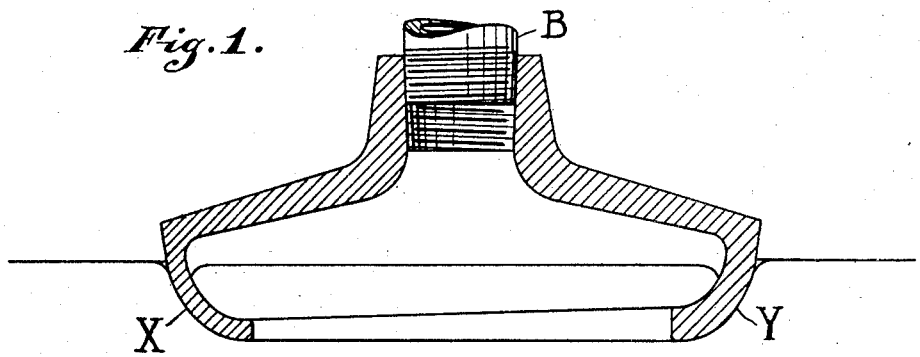
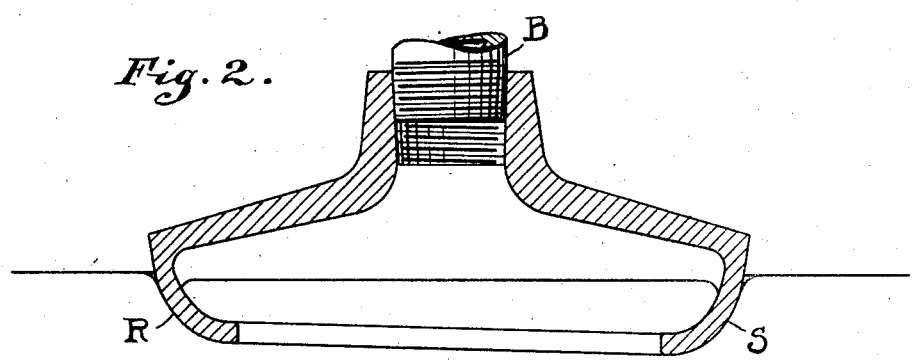
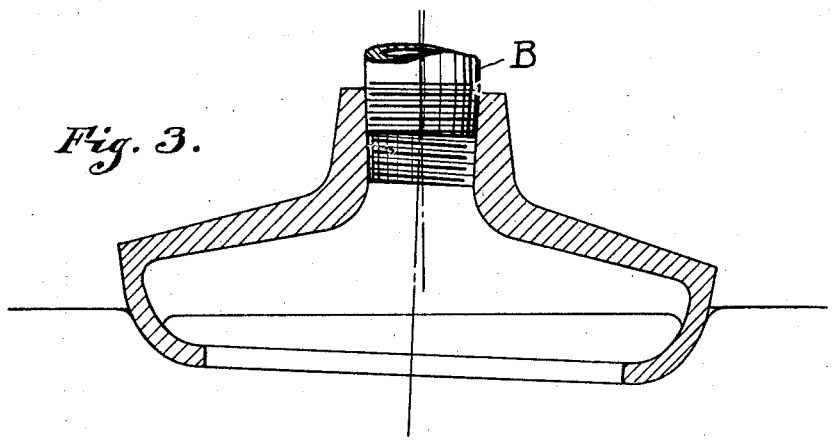
INVENTOR.
Walter E. Buzby,
BY
Hood + Hahn.
ATTORNEYS Patented Mar. 29, 1927.

1,622,417

UNITED STATES PATENT OFFICE.

WALTER E. BUZBY, OF WICHITA FALLS, TEXAS.

GLASS DRAWING AND APPARATUS THEREFOR.

Application filed April 7, 1925. Serial No. 21,323.

In the drawing of glass cylinders from a molten bath by means of a gradually rising bait and distending air pressure, there is a tendency at times, due to unsymmetrical temperature conditions of the bath, for the base of the growing cylinder to move to one side or another relative to the line of vertical movement of the base, the growing cylinder moving away from said line toward that portion of the bath which is the coolest or toward that portion of the circumference of the growing cylinder immediately adjacent the bath which is the coolest. Heretofore it has been proposed, in the patent to Lubbers No. 914,588, to compensate such tendency to "off draw" by initially off centering the bait relative to the bath of molten glass.

It is preferable, however, for many reasons, having once established a centralization of the bait and its line of drawing movement relative to the bath, to maintain such centralization and I have discovered means and method by which any tendency of the cylinder to off draw, with the bait centralized upon the pot, may be compensated.

Having established the fact of a tendency, during any particular period, for successive cylinders to off draw in some particular direction relative to the bath I substitute, for a standard uniform and symmetrical bait, an unsymmetrical bait, the non-symmetry of which is such as to compensate the off drawing tendency.

I have found that the desired result may be attained in several ways. For instance the bait may be unsymmetrical axially, that is, one side of the bait may be deeper than the other; or one side of the bait may be unsymmetrical circumferentially, that is, one side of the bait may be thicker than another side and thus produce a greater chilling effect; or a symmetrical bait may be tilted on the pipe, the axis of the pipe passing through the center of the orifice of the bait, so that one side of the bait will dip more deeply into the bath than the opposite side.

In all of these cases the bait, as it enters the bath, serves to chill the bath more upon one side of the line of draw than upon the other side and therefore, when it is found that a particular bath, in successive draws, presents a tendency, (either inherent or due to external drafts) to off draw, my unsymmetrical bait will be placed in the hoisting mechanism in such manner that its maximum bath chilling portion will be opposed to the portion of the bath toward which the off drawing tends, thus compensating the off drawing tendency.

The accompanying drawings illustrate, diagrammatically, baits having the desired characteristics. The precise non-symmetry will of course vary with conditions well understood by those skilled in the art.

Fig. 1 illustrates diagrammatically a bait, associated with a glass bath, in which the bait is non-symmetrical as to thickness; Fig. 2 a similar view where the bait is non-symmetrical as to depth; and Fig. 3 a similar view where the bait is itself symmetrical but is non-symmetrical relative to the draw line by reason of the tilting.

It will of course be understood that the configuration of the bait is not necessarily that shown in the drawings, the drawings being merely intended to typify my invention.

In Fig. 1 the bait is a common form of bell shape with an inturned lower flange, the thickness of that portion of the flange which becomes immersed in glass varying uniformly from thin at X to thick at Y.

In Fig. 2 the bait is shown as varying uniformly circumferentially from a short side at R to a long side at S.

In Fig. 3 the bait is symmetrical, both circumferentially and axially but the axis of the bait itself is at a slight angle to the axis of the blow pipe B, as indicated.

In the use of any one of these forms the bait will be supported upon the hoisting carriage in the usual manner by suitable forks, being so placed that the orifice of the bait is centralized upon the bath. When the bait is placed in the forks of the hoisting carriage it will be positioned circumferentially so as to compensate irregularities of temperature conditions in the bath in the manner already described.

It will be readily understood that maximum chilling effects may, if desired, be highly localized, instead of gradually developed as indicated in the drawings, without departing from my invention.

It will also be apparent that, in those forms in which one side of the bait may emerge from the bath earlier than at the other, the cylinder will blow outwardly on this side before it will on the other so that, if the high side of the bait be set toward the side of the bath from which the glass tends to draw thicker, the cylinder will be so started relative to the bath as to offset the tendency to draw thick.

I claim as my invention:

1. In the art of drawing glass cylinders, the method of compensating non-uniformity of temperature conditions of the surface of the bath which comprises the utilization of a bait non-symmetrical circumferentially as to bath chilling characteristics and the initial setting of said bait whereby a cooler portion of the bath will be less chilled than a hotter portion at the initiation of the draw.

2. In the art of drawing glass cylinders, the method of compensating non-uniformity of temperature conditions of the surface of the bath which comprises the immersion, in the surface of the bath, of a bait arranged so as to initially chill a hotter portion of the bath more than a cooler portion of the bath.

3. A bait for glass drawing comprising a hollow body having an inturned lower flange forming an orifice, said flange being thicker at one side than at another.

4. A bait for glass drawing comprising a hollow stem and a hollow bait end having an inturned circumferential flange forming an orifice, said flange being circumferentially non-symmetrical relative to the stem.

5. A bait for glass drawing comprising a hollow stem and a hollow bait end having an inturned circumferential flange forming an orifice, said flange being thicker at one side than at another.

In witness whereof, I, WALTER E. BUZBY, have hereunto set my hand at Texas, this 17th day of March, A. D. one thousand nine hundred and twenty-five.

WALTER E. BUZBY.